March 29, 1966          D. N. BROWN          3,243,275
METHOD AND APPARATUS FOR PRODUCING GLASS SHEET
Filed Aug. 15, 1962
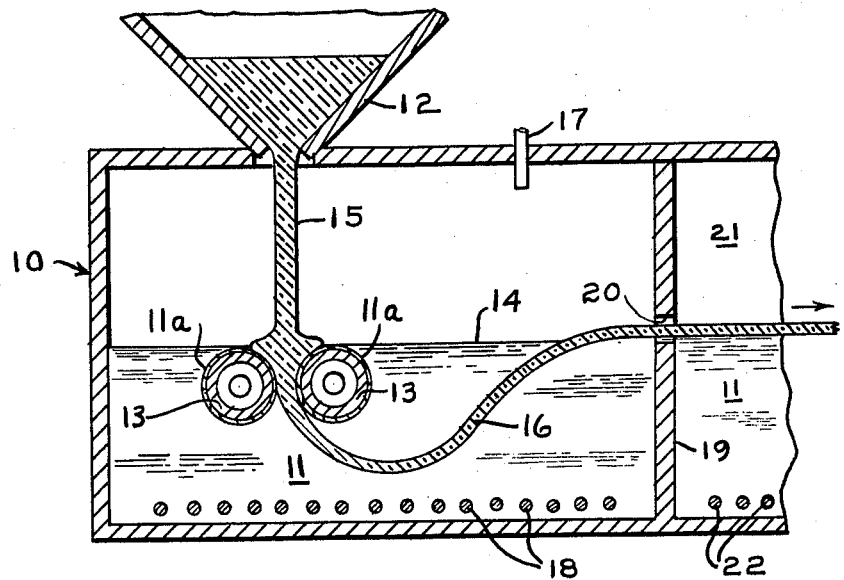
INVENTOR.
DONALD N. BROWN
BY Clarence R. Patty, Jr.
ATTORNEY United States Patent Office 3,243,275
Patented Mar. 29, 1966

3,243,275
METHOD AND APPARATUS FOR PRODUCING GLASS SHEET
Donald N. Brown, Corning, N.Y., assignor to Corning Glass Works, Corning, N.Y., a corporation of New York
Filed Aug. 15, 1962, Ser. No. 217,068
7 Claims. (Cl. 65—65)

This invention relates to the production of sheet glass and more particularly to an improved method of an apparatus for continuously producing sheet glass having a surface finish equivalent to that of a fire finish.

In the past it has been customary to roll-form sheet glass by flowing molten glass from a spout or lip of a melting furnace to a pair of sizing rolls which squash the molten glass to form a sheet of desired thickness. During such sizing operation the glass undergoes a severe heat exchange due to its contact with the metal surfaces of the sizing rolls, which results in uneven stiffening and surface harm. After rolling, the sheet is usually supported on a metal apron or series of rollers which direct it to a lehr. This form of delivery not only produces further heat exchanges between the under surface of the glass sheet and the apron or rollers, but also has a tendency to produce marring, abrasions, and other surface defects in the sheet.

In order to reduce surface abrasion during such transfer, a method has been devised wherein the glass is transferred along the surface of a molten metal bath which is successively cooled before the sheet enters a lehr. However, before entering the bath the glass sheet is sized in direct contact with the metal rollers and transferred over conveyor rollers to the bath, thereby producing a series of heat exchanges which not only cool and stiffen the glass sheet but also produce the imperfections inherently formed during glass to metal contact. The molten metal bath must be initially maintained at such a sufficiently high temperature to reheat and remelt the undersurface of the glass sheet so as to remove the imperfections and provide a smooth surface. Such a system is shown in U.S. Patent No. 2,911,759.

In accordance with the present invention, glass sheet is formed by minimizing or eliminating contact between molten glass and a solid metal forming surface, by partially or wholly immersing the forming means in a molten bath. A pair of sizing rollers, for example, may be positioned in a molten metal bath maintained at a temperature within 50° C. of the working temperature of the glass being formed. The glass is then transferred along the molten bath where it is cooled to a point where it may be transferred to a lehr without harm to the glass surface. Accordingly, the only glass to solid metal surface contact which could be encountered would be that quadrant of the rollers which initially form the glass. However by suitably adjusting the speed of the roller and/or the immersion of the rolls in the molten bath, glass to solid metal contact may be eliminated in its entirety by causing a layer of the molten bath to travel along the surface of the rollers and provide a continuous film between the molten glass and the metal rollers, thus in effect, forming sheet having a fire finish. In view of the fact that no surface defects are produced in the glass during the forming operation, it is unnecessary to reheat and remelt the glass as in the past, but rather the sheet may be immediately subjected to a cooling process facilitating quick removal from the bath.

The molten bath may be of any suitable composition which is inert to the glass being formed, the confining tank, and the atmosphere above the bath. In addition, the melting temperature of the material comprising the bath must be below the softening temperature of the glass being formed. Low melting metals such as tin, aluminum, lead, etc., and certain alloys of such metals have been found to be operative.

It thus has been an object of my invention to provide an improved method of forming sheet glass wherein molten glass to solid metal contact is minimized or completely eliminated.

A further object of my invention has been to provide an improved method of manufacturing sheet glass and the like wherein the surface of such glass, as formed, is equivalent to a fire finish.

An additional object of my invention has been to provide improved apparatus for forming sheet glass and the like wherein molten glass to solid metal contact is either minimized or completely eliminated.

These and other objects of my invention will be apparent to those skilled in the art from the following specification and drawing.

The figure is a schematic side elevational view in section of apparatus embodying my invention wherein means for forming sheet glass are submerged in a molten bath.

Referring now to the drawing, a tank 10 having a molten bath 11 is shown positioned beneath a slotted orifice 12 of a suitable source of glass. A pair of rollers 13 are shown in a submerged position within the tank below the surface 14 of the molten bath 11. Molten glass 15 is fed to the rollers 13 where it is sized into glass sheet 16. A controlled atmosphere, such as a reducing atmosphere, is maintained within the tank 10 above the surface 14 of the molten bath 11 by means of a suitable inlet 17. Temperature regulating means 18 are shown positioned within the bath 11 to control the temperature of the bath during the forming operation.

The tank 10 is provided with a partition 19 dividing the tank into a forming compartment and a cooling compartment 21. The partition is shown provided with a slot or opening 20 adjacent the molten line 24 for the passage of the formed glass sheet 16 into the cooling compartment 21. Compartment 21 is provided with a plurality of thermal regulating means 22 for controlling the cooling of the glass sheet 16. After being sufficiently cooled, the sheet is continuously removed from the compartment 21 and directed through a lehr in the conventional manner. Compartment 21 also contains a molten bath 11 with a controlled atmosphere maintained thereabove, which is utilized for transferring and cooling the glass sheet 16.

In operation, molten glass is continuously stream fed downwardly to forming means partially or wholly submerged in a molten bath, such as a suitable molten metal bath. A controlled atmosphere, such as a reducing atmosphere is maintained above the molten bath to prohibit oxidation and the formation of scum on the bath surface. As shown, the forming means may be a pair of variable speed rotating rollers wholly submerged within the molten metal bath. The bath is preferably maintained within about 50° C. of the working range of the glass being formed, by the thermal control means 18. The molten bath controls the temperature of the rollers and functions to maintain them at substantially the same temperature as the bath. If desired, the rollers may be supplied with conventional temperature control means to facilitate the maintenance of a constant predetermined roller temperature.

The depth of the rolls within the bath and/or their speed may be adjusted so that a film 11a of the molten bath clings to the surface of the roller and molten glass to solid metal contact is eliminated. Accordingly, glass sheet is produced having the surface qualities substantially equivalent to that of a fire finish, thus eliminating the necessity of reheating the glass to remelt the surface thereof and remove imperfections inherently produced from glass to metal contact. As a result, the formed sheet glass may be conveyed along the molten bath directly to a cooling chamber and thence to a lehr in a conventional manner.

When the molten bath is less dense than the glass being formed, the degree of immersion of the rolls within the bath is immaterial since the molten glass will flow downwardly into the bite of the rolls and be drawn therethrough into sheet. The sheet thus formed is then drawn through the bath in the cooling chamber below the surface by conventional means. However, when the density of the molten bath is greater than that of the glass being formed, the forming rolls should be positioned near the surface of the molten bath and preferably with the uppermost portions thereof above the surface of the bath while maintaining the bite below the surface. Dams may be positioned adjacent the ends of the rolls to facilitate the maintenance of a pool of molten glass at the bite. The inertia of the downward fed stream, however, is usually sufficient to force the glass into the bite for the formation of sheet. Such sheet glass is then conveyed along the surface of the bath in the cooling chamber, as shown in the drawing, and on to a lehr in conventional manner.

Although I have disclosed the now preferred embodiment of my invention, it will be apparent to those skilled in the art that various modifications and changes may be made thereto without departing from the spirit and scope of the invention as defined in the appended claims.

1. Improved apparatus for producing sheet glass comprising, a tank containing a bath of molten material inert to the glass being formed, means positioned within said bath for forming sheet glass below the surface of said molten bath from stream-fed molten glass delivered thereto, means cooperating with said tank for downwardly stream feeding molten glass below the surface of said bath and to said forming means, and means for regulating the temperature of said molten bath and said forming means.

2. Improved apparatus for forming sheet glass having a surface quality as formed equivalent to a fire finish comprising, a closed tank containing a molten bath of predetermined depth, a pair of cooperable rollers positioned within said tank with the bite of said rollers being below the surface of said molten bath, means for stream feeding molten glass to the bite of said cooperable rollers for forming sheet glass below the surface of the bath, means for controlling the temperature of said molten bath, and means for controlling the atmosphere within said tank above the surface of said molten bath.

3. Apparatus for forming sheet glass and the like with a surface finish equivalent to a fire finish which comprises, a tank containing a molten bath of material substantially inert to glass, a pair of sizing rolls positioned within said tank with the bite thereof below the surface of said molten bath, means for stream feeding molten glass to the bite of said sizing rolls, a fluid film of said molten bath surrounding each of said rolls to prevent glass to solid surface contact during sizing and thus form sheet glass from the stream-fed molten glass below the surface of such bath having a fire-like surface finish, means for controlling the temperature of said molten bath and said sizing rolls, means for regulating the atmosphere within said tank above the surface of said molten bath, and fluid means for controllably cooling the thus formed sheet glass and conveying such sheet to a lehr while inhibiting surface abrasions.

4. Apparatus for producing sheet glass and the like having a surface finish as formed equivalent to a fire finish which comprises, a closed tank containing a molten bath of metallic material having a melting point below the softening point of the glass being formed, a partition separating said tank into a forming chamber and a cooling chamber, said partition having an open portion communicating between said forming and cooling chambers, a pair of forming rolls positioned in said forming compartment with the bite of said rollers beneath the surface of said molten bath, means communicating with said forming compartment for stream feeding molten glass to the bite of said forming rolls, a molten metal film intermediate said forming rolls and said molten glass prohibiting glass to solid metal contact during the forming of the glass sheet below the surface of such molten bath and facilitating the production of a fire-like finish thereon, means for regulating the temperature of said molten bath, means for controlling the atmosphere within said tank above said molten bath, and means for controlling the temperature of the molten bath in said cooling chamber for cooling the thus formed glass sheet transferred through said open portion to the bath in said cooling chamber.

5. A method of producing sheet glass and the like having a surface finish as formed equivalent to that of a fire finish which comprises, stream feeding molten glass into a molten bath having a melting temperature below the softening temperature of such glass, and roll-forming sheet glass within and below the surface of such bath from such stream-fed molten glass.

6. A method of forming sheet glass and the like having improved surface qualities as formed which comprises, downwardly stream feeding molten glass into a molten metal bath having a melting point below the softening point of the glass being fed thereto, roll-forming glass sheet from such stream-fed molten glass below the surface of such molten metal bath and regulating the temperature of such bath to controllably cool the sheet so formed.

7. An improved method as defined in claim 6 including the step of controlling the atmosphere above the molten bath and about the downwardly fed stream of molten glass to inhibit oxidation.

References Cited by the Examiner

UNITED STATES PATENTS

| 1,422,036 | 7/1922 | Crowley et al. | 65—26 |
| 2,968,892 | 1/1961 | Pilkington | 65—182 |
| 2,968,893 | 1/1961 | Pilkington | 65—182 |

FOREIGN PATENTS 815,431  7/1937  France.

DONALL H. SYLVESTER, *Primary Examiner.*

D. CRUPAIN, *Assistant Examiner.*